O. E. HUNT.
FOLDING SEAT.
APPLICATION FILED NOV. 28, 1913.

1,239,185.

Patented Sept. 4, 1917.

Witnesses:
Clair J. Cote
Le Roe J. Williams

Inventor:
Ormond E. Hunt,
By Miller T. Tibbetts,
Attorney.

UNITED STATES PATENT OFFICE.

ORMOND E. HUNT, OF DETROIT, MICHIGAN, ASSIGNOR TO PACKARD MOTOR CAR COMPANY, OF DETROIT, MICHIGAN, A CORPORATION OF MICHIGAN.

FOLDING SEAT.

1,239,185.     Specification of Letters Patent.     Patented Sept. 4, 1917.

Application filed November 28, 1913. Serial No. 803,541.

*To all whom it may concern:*

Be it known that I, ORMOND E. HUNT, a citizen of the United States, and resident of Detroit, Wayne county, State of Michigan, have invented certain new and useful Improvements in Folding Seats, of which the following is a specification.

This invention relates to motor vehicles and particularly to folding seats therefor. One of the objects of the invention is to provide a folding seat of simple and inexpensive construction which is at the same time strong and durable and is adapted for motor vehicle use.

Another object of the invention is to provide a folding seat having arms so connected with the seat bottom that both the arms and the seat bottom may be folded together.

Another object of the invention is to provide a folding seat having arms with connections between the arms and a seat bottom whereby the seat is yieldingly held in folded position by the spring action of the parts themselves.

Other objects of the invention will appear from the following description taken in connection with the drawings which form a part of this specification, and in which:—

Figure 2:
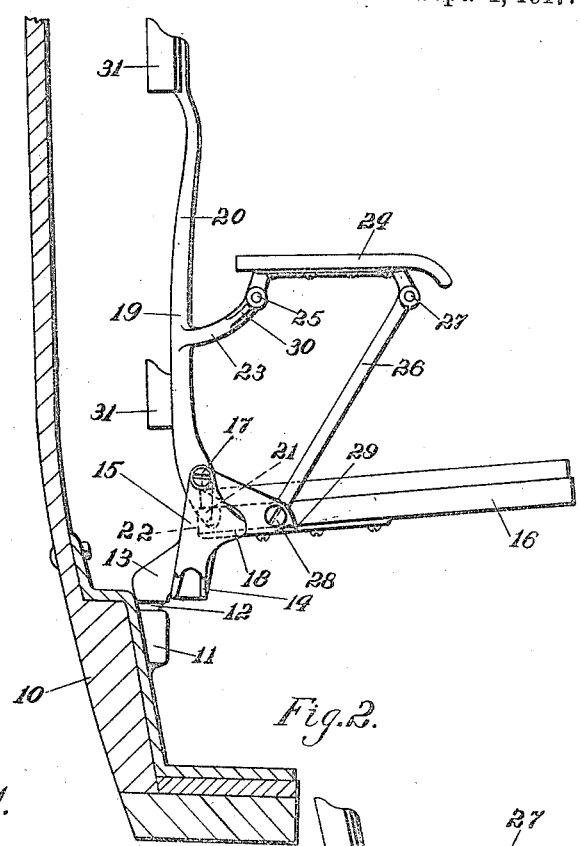
Fig. 2 is a view similar to Fig. 1 with the seat in open or operative position.

Referring to the drawings, 10 represents a portion of the body of a motor vehicle to which is secured a bracket 11 in which is mounted, preferably upon a pivot 12, a support or bracket 13. This pivotal support permits the seat to be used facing transversely of the vehicle as shown in Fig. 2 or it may be swung around on the pivot 12 so that it faces forwardly of the vehicle.

The support 13 has a body portion 14 extending horizontally from the pivot 12 and a pair of upwardly extending lugs 15 at the ends of the body portion. The seat bottom 16 is pivotally supported in the lugs 15 as at 17 and a stop 18 abuts against the seat bottom 16 at a suitable point to hold the latter in a substantially horizontal position when the seat is open. It will be seen that the seat bottom 16 may be folded to an upright position as shown particularly in Fig. 1.

Figure 1:
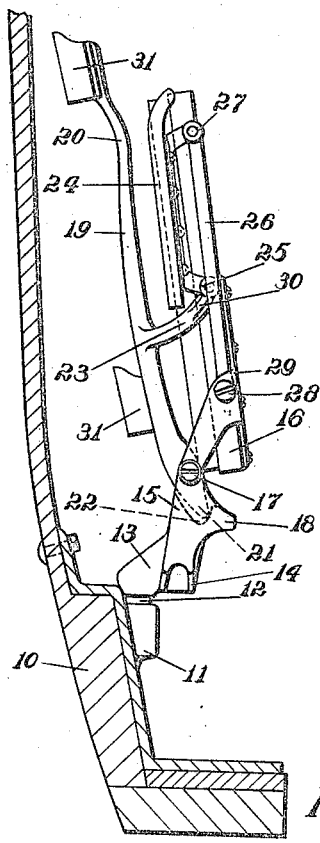
Figure 1 is a transverse section through a motor vehicle illustrating a folding seat mounted therein and built according to this invention, said seat being shown in folded position.

The seat back 19 is suitably supported upon the support or bracket 13 and it is shown as having its upright members 20 mounted upon the pivot 17 which also supports the seat bottom. The uprights 20 are provided with lugs 21 extending downwardly from the pivots 17, which lugs operate in depressions 22 formed in the lugs 15 of the bracket 13. These depressions 22 are of such form as to permit of a slight oscillation of the seat back 19 so that the back may rest closer to the side of the vehicle when the seat is in folded position as shown in Fig. 1. The normal position of the back is shown in Fig. 2.

Intermediate of the ends of the uprights 20 are lugs or forwardly extended arms 23 and to these arms are pivoted the arm rests 24 as at 25. Forwardly of the pivots 25 a link 26 is pivoted to each of the arms 24 as at 27 and to the seat bottom 16 as at 28. These links 26 are so connected to the seat bottom that they can swing to a position parallel with the seat bottom as shown in Fig. 1 and are prevented from swinging any farther by means of stops 29. Therefore, any attempt to push the seat bottom farther to the left in Fig. 1 would tend also to push the links 26 with it, and as the links intermediate their ends abut against another pair of stops 30 on the arms 23, the links and consequently the seat bottom are prevented from folding farther.

Figures 3, 4, 5:
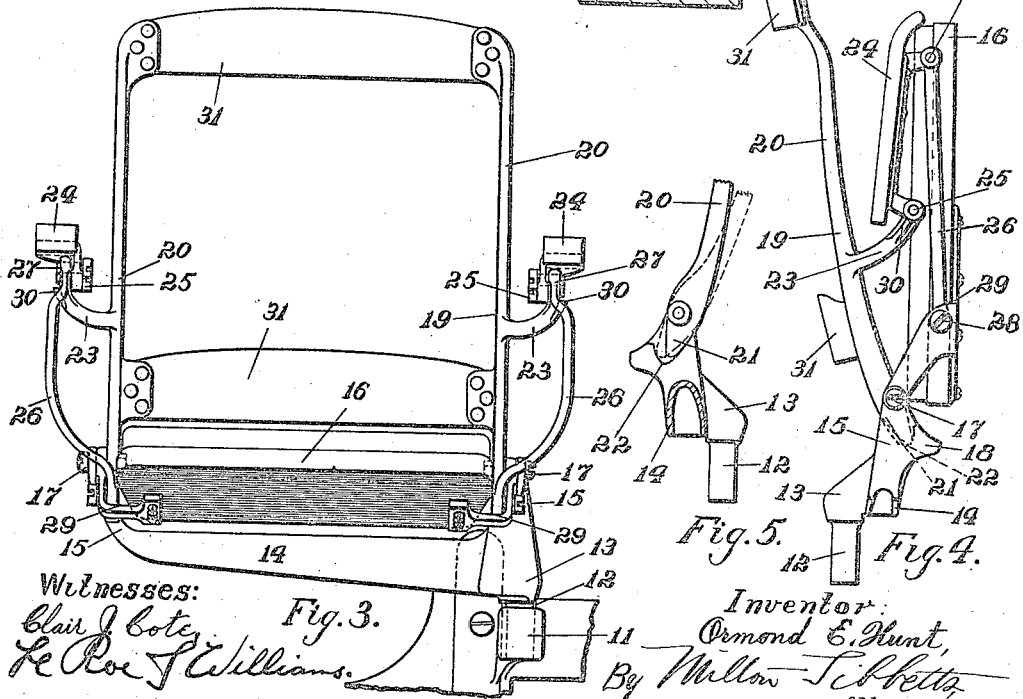
Fig. 3 is an elevation of the seat looking from the front thereof.
Fig. 4 is a view of the seat similar to that shown in Fig. 1 except that the seat has not quite reached its full folded position.
Fig. 5 is a detail view.

It will be seen that the link 26 on each side of the seat is so pivoted to the arm rest and to the seat bottom, and the pivots 25 and 17 are so arranged relative thereto, that the seat is yieldingly held in its folded position by reason of the fact that the point 27 on the arm rest has passed beyond a line drawn through the seat bottom pivot 17 and the arm rest pivot 25. It will be seen that this makes what may be termed a closed toggle connection, the pivot 27 having passed over the dead center and thus locked the seat yieldingly in its folded position. The stops 29 and 30 it will be seen, limit the movement of the seat so it cannot be folded beyond that point and the inherent spring in the various parts and particularly in the links 26 which may be somewhat bowed as shown in Fig. 3 cause just enough give to permit the point 27 to pass over the dead center. This holding of the seat in folded position is of considerable advantage in motor vehicle use as otherwise the seat might be inclined to drop down of its own weight after the joints had become slightly loosened.

It will be understood that the seat bottom 16, the arm rest 24, and the cross members 31 of the seat back, may be suitably upholstered, but this upholstering is omitted from the drawings for clearness. It will be understood also that the invention is not limited to the exact details of construction shown as it will be apparent that changes may be made without departing from the spirit or scope of the invention.

Having thus described my invention, what I claim and desire to secure by Letters Patent is:—

1. A folding seat comprising a support or bracket, a seat back pivoted thereto, depressions in said bracket, lugs on said seat back operating in said depressions, a seat bottom pivoted to said bracket, arm rests pivoted to said seat back, and means connected with the seat bottom and arm rests for folding said bottom and arm rests.

2. A folding seat comprising a support or bracket, a seat bottom pivoted thereto and adapted to fold from a substantially horizontal position to an upright position, a seat back, arm rests pivoted to the seat back and adapted to fold from a substantially horizontal position to an upright position, and links pivoted at their respective ends to the seat bottom and to the forward part of the arm rests, the parts being so constructed and arranged that in moving to folded position the seat is yieldingly held in folded position by the spring action of the parts themselves.

3. A folding seat comprising a support or bracket, a seat bottom pivoted thereto and adapted to fold from a substantially horizontal position to an upright position, a seat back, arm rests pivoted to the seat back and adapted to fold from a substantially horizontal position to an upright position, and links so pivoted to the seat bottom and arms respectively that the parts form a closed toggle to hold the seat yieldingly in folded position.

4. A folding seat comprising a support or bracket, a seat bottom pivoted thereto and adapted to fold from a substantially horizontal position to an upright position, a seat back, arm rests pivoted to the seat back and adapted to fold from a substantially horizontal position to an upright position, and links pivoted at their respective ends to the seat bottom, and to the forward part of the arm rests, the parts being so constructed and arranged that in moving to folded position the forward pivots on the arm rests pass beyond a line drawn through the seat bottom pivot and arm rest rear pivot to thereby yieldably lock the seat in folded position.

5. A folding seat comprising a support or bracket, a seat bottom pivoted thereto and adapted to fold from a substantially horizontal position to an upright position, a seat back, arm rests pivoted to the seat back and adapted to fold from a substantially horizontal position to an upright position, links pivoted at their respective ends to the seat bottom and to the forward part of the arm rests, the parts being so constructed and arranged that in moving to folded position the forward pivots on the arm rests pass beyond a line drawn through the seat bottom pivot and the arm rest rear pivot and the pivot of the link to the seat bottom remains intermediate the bottom pivot and arm rest rear pivot and substantially in alinement with both arm rest pivots, and a stop to limit the folding action of the seat.

6. A folding seat comprising a support or bracket, a seat bottom pivoted thereto and adapted to fold from a substantially horizontal position to an upright position, a seat back, arm rests pivoted to the seat back and adapted to fold from a substantially horizontal position to an upright position, links pivoted at their respective ends to the seat bottom and to the forward part of the arm rests, the parts being so constructed and arranged that in moving to folded position the forward pivots on the arm rests pass beyond a line drawn through the seat bottom pivot and the arm rest rear pivot and the pivot of the link to the seat bottom remains intermediate the bottom pivot and arm rest rear pivot and substantially in alinement with both arm rest pivots, and stops acting against said links to limit the folding action of the seat.

In testimony whereof I affix my signature in the presence of two witnesses.

ORMOND E. HUNT.

Witnesses:
L. A. WING,
LE ROI J. WILLIAMS.

Copies of this patent may be obtained for five cents each, by addressing the "Commissioner of Patents, Washington, D. C."